US012784421B2

(12) United States Patent
Armstrong et al.

(10) Patent No.: US 12,784,421 B2
(45) Date of Patent: Nov. 3, 2026

(54) SYSTEMS AND METHODS FOR IMPROVED TRAINING OF MACHINE LEARNING MODELS

(71) Applicant: Aligned AI Limited, Oxford (GB)

(72) Inventors: Stuart Armstrong, Oxford (GB); Rebecca Gorman, Oxford (GB)

( * ) Notice: Subject to any disclaimer, the term of this patent is extended or adjusted under 35 U.S.C. 154(b) by 656 days.

(21) Appl. No.: 18/300,202

(22) Filed: Apr. 13, 2023

(65) Prior Publication Data

US 2023/0334835 A1 Oct. 19, 2023

Related U.S. Application Data

(60) Provisional application No. 63/420,098, filed on Oct. 28, 2022, provisional application No. 63/405,906, filed on Sep. 13, 2022, provisional application No. 63/349,057, filed on Jun. 4, 2022, provisional application No. 63/348,595, filed on Jun. 3, 2022, provisional application No. 63/331,070, filed on Apr. 14, 2022.

(51) Int. Cl.
*G06V 10/774* (2022.01)
*G06V 10/771* (2022.01)

(52) U.S. Cl.
CPC ........ *G06V 10/7753* (2022.01); *G06V 10/771* (2022.01)

(58) Field of Classification Search
None
See application file for complete search history.

(56) References Cited

U.S. PATENT DOCUMENTS

| | | | | |
|---|---|---|---|---|
| 10,971,142 | B2 * | 4/2021 | Sriram | G10L 15/20 |
| 11,164,045 | B2 * | 11/2021 | Paik | G06F 3/167 |
| 11,992,877 | B2 * | 5/2024 | Shinkawa | B22F 9/082 |
| 2019/0130903 | A1 * | 5/2019 | Sriram | G10L 15/063 |
| 2020/0356854 | A1 * | 11/2020 | Li | G06N 3/084 |
| 2021/0319266 | A1 * | 10/2021 | Chen | G06F 18/2155 |
| 2023/0237771 | A1 * | 7/2023 | Wen | G06V 20/698 382/128 |

(Continued)

FOREIGN PATENT DOCUMENTS

| | | | | |
|---|---|---|---|---|
| WO | 2019056000 A1 | | 3/2019 | |
| WO | WO-2021059388 A1 | * | 4/2021 | G06N 3/0464 |

OTHER PUBLICATIONS

International Search Report in PCT/US2023/065733, mailed Jul. 13, 2023, 16 pages.

(Continued)

*Primary Examiner* — Tahmina N Ansari
(74) *Attorney, Agent, or Firm* — Adam Warwick Bell; Matthew Rupert Kaser

(57) ABSTRACT

Systems and methods applicable, for instance, to training machine learning models (MLMs). Training of a multihead classifier MLM can utilize a two term loss function. A first term of the loss function can be used to reward each of the heads for the extent to which it properly predicts labels of the labeled training data instances. A second term of the loss function can reward each of the heads for the extent to which it disagrees with each of the other heads in terms of predicting labels. As such, the MLM can both predict proper labels for the labeled training data instances and be distinct on the unlabeled instances.

10 Claims, 7 Drawing Sheets

(56) References Cited

U.S. PATENT DOCUMENTS

| | | | | |
|---|---|---|---|---|
| 2023/0334835 | A1* | 10/2023 | Armstrong ............ | G06N 3/092 |
| 2024/0185576 | A1* | 6/2024 | Sugasawa ............. | G06V 10/87 |

OTHER PUBLICATIONS

Pfau et al., "Connecting Generative Adversarial Networks and Actor-Critic Methods," arXiv preprint, Jan. 18, 2017, No. 1610.01945v3, pp. 1-10.
Kostrikov et al., "Image Augmentation Is All You Need: Regularizing Deep Reinforcement Learning from Pixels," arXiv preprint, Mar. 7, 2021, No. 2004.13649v4, pp. 1-22.
Yoonho Lee et al., Diversify and Disambiguate: Learning From Underspecified Data, Cornell University, Feb. 7, 2022, pp. 1-17.

* cited by examiner

SYSTEMS AND METHODS FOR IMPROVED TRAINING OF MACHINE LEARNING MODELS

CROSS-REFERENCE TO RELATED APPLICATIONS

This application claims priority to: a) U.S. Provisional Application Ser. No. 63/331,070, filed Apr. 14, 2022; b) U.S. Provisional Application Ser. No. 63/348,595, filed Jun. 3, 2022; c) U.S. Provisional Application Ser. No. 63/349,057, filed Jun. 4, 2022; d) U.S. Provisional Application Ser. No. 63/405,906, filed Sep. 13, 2022; and e) U.S. Provisional Application Ser. No. 63/420,098, filed Oct. 28, 2022, the disclosures of which are hereby incorporated by reference in their entirety and for all purposes.

FIELD OF THE INVENTION

The present disclosure relates generally to machine learning, and more specifically, but not exclusively, to systems and methods for improved training of machine learning models.

BACKGROUND OF THE INVENTION

Machine learning models (MLMs) can be trained to learn functions/algorithms so as to perform tasks such as receiving an input (e.g., an image or sentence) and generating a corresponding classification label. However, when conventional training approaches are used, these MLMs can exhibit undesirable operation when presented with out-of-distribution (OOD) inputs.

As just an illustration, suppose a MLM task of classifying pet images as depicting either cats or dogs. Suppose further that a conventional training set available for the task suffered from all or many of the cat images having an indoor background such as upholstery, and from all or many of the dog images having an outdoor background such as grass or soil. Here, the conventional training set would exhibit underspecification with on one hand animal-related features, and on the other hand background-related features, each according to conventional approaches seeming a valid set of features for distinguishing a cat image from a dog image. As such, conventional MLM training could result in a classifier MLM that used background-related features for distinguishing a cat image from a dog image. Accordingly, when presented with an OOD image of a cat outside on grass, this conventionally trained MLM would incorrectly classify the image as being that of a dog.

Machine learning engineers have long had concerns about this and have tried to resolve the issue in various ways. One approach is the ensemble approach. Here instead of training a single MLM to learn a single function/algorithm A, multiple MLMs can be trained to each learn one of multiple functions/algorithms $A_0$, A1, . . . $A_n$ on the same set L of labeled training data instances. Implementors of this approach proceed with the hope is that at least some of the learned functions/algorithms will happen to focus on the feature(s) of interest. But modern conventional MLMs tend to exhibit a simplicity bias. In particular if undesired (e.g., spurious) feature(s) (e.g., background-related features according to the above classification of pet images example) are simpler than the desired feature(s) (e.g., animal-related features according to the classification of pet images example), then the functions/algorithms learned by the MLMs of the ensemble will typically focus on the undesired feature(s).

With "Diversify and disambiguate: Learning from underspecified data" (2022), Lee et al. take an approach of assuming that there are multiple independent features in an unlabeled dataset U, and training an ensemble of MLMs to find them. However, the Lee approach exhibits multiple flaws. As an example, the Lee approach requires that the features be independent. As another example, the Lee approach functions poorly when the features are of different complexity.

In view of the foregoing, a need exists for improved systems and methods for training MLMs, in an effort to overcome the aforementioned obstacles and deficiencies of conventional approaches.

SUMMARY

According to various embodiments, MLMs can be trained to learn one or more functions/algorithms in a more effective way. To ease description, discussion herein is generally in the context of the training of a multihead classifier MLM. But, it is to be understood that the approaches discussed can be applied to the training of other MLM configurations (e.g., ensembles of multiple single-head MLMs, and/or MLMs generating reward functions or recommendation lists). By use of the training approaches discussed herein, such a multihead classifier MLM (e.g., a transformer encoder-based multihead classifier, for instance a BERT classifier), once trained, can be able to generate an accurate classification prediction output for a given input, even where such input is OOD. As just an illustration, the multihead classifier MLM can receive a sentence as input, and generate an output label that specifies whether or not the inputted sentence is coherent and convincing. As such, the multihead classifier MLM can be used as a critic MLM to provide feedback to a second MLM that generates sentences (e.g., a transformer decoder-based generative MLM).

The training of the multihead classifier MLM can include the use of training data that includes both labeled and unlabeled instances. As just an example, the instances can correspond to sentences, and labels for the labeled instances can specify whether or not the corresponding sentence is coherent and convincing.

Training of the multihead classifier MLM can consider each of the heads of the MLM. According to this training, a two term loss function can be applied. A first term of the loss function can be used to reward each of the heads for the extent to which it properly predicts labels of the labeled training data instances. Then, a second term of the loss function can be used to consider each of the heads against each of the other heads in a pairwise fashion. More specifically, this second term can reward each of the heads for the extent to which it disagrees with each of the other heads in terms of predicting labels for a selected subset of the unlabeled training data instances. This selected subset can include a chosen quantity of ambiguous unlabeled training data instances for which there is maximal disagreement among heads of a pair. Beneficially, such ambiguous unlabeled training data instances can correspond to ones that possess features that cause disagreement. As just an example, the selected subset can be a single element subset.

In this way, training of the multihead classifier MLM can result in it having heads that on one hand predict proper labels for the labeled training data instances, but on the other hand are distinct on the unlabeled instances (e.g., insofar as using different features to generate labels). Due to this use of different features, the MLM, once trained, can operate more effectively when presented with OOD inputs. Various aspects will now be discussed in greater detail.

DETAILED DESCRIPTION

Figure 1:
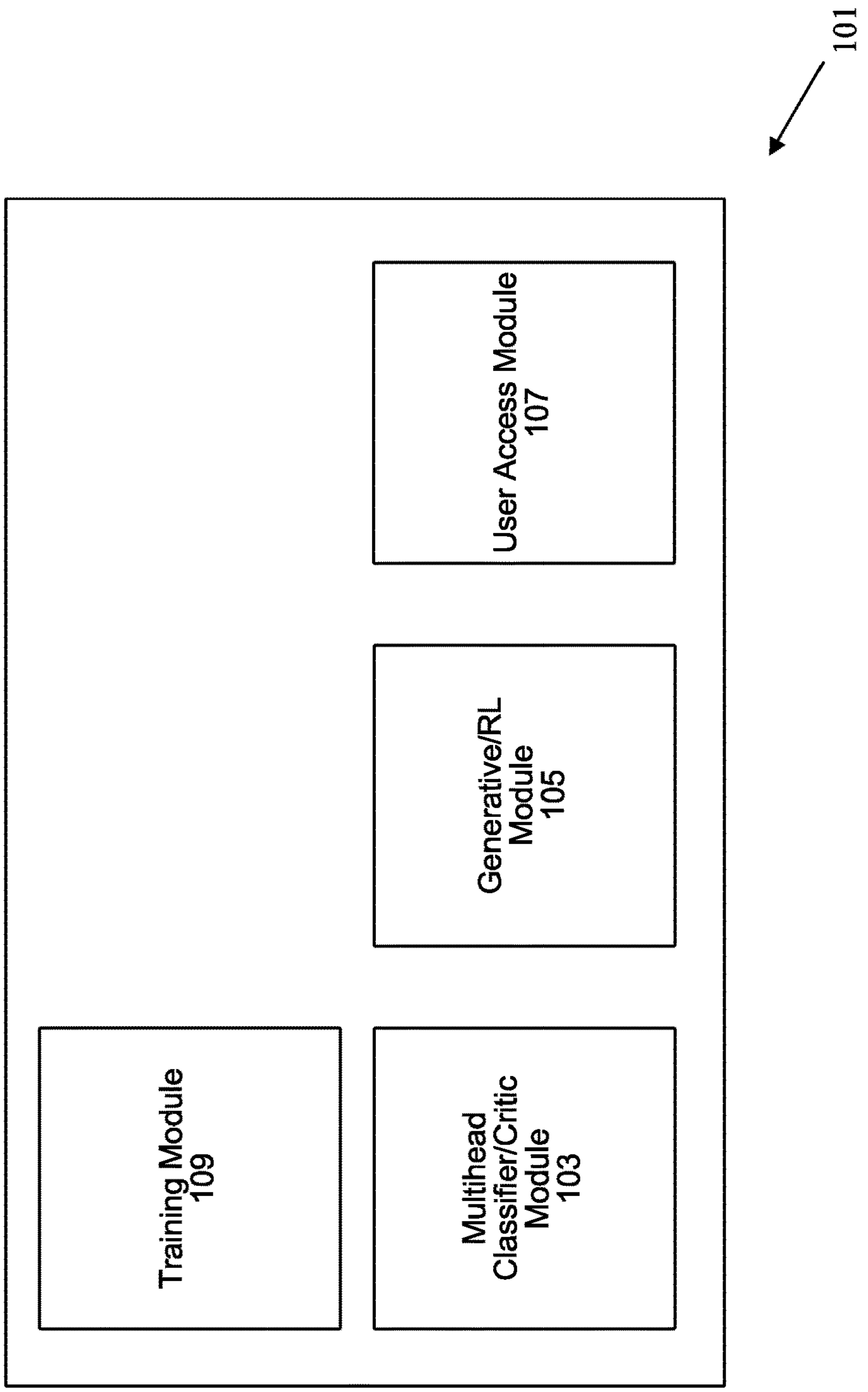
FIG. 1 shows a system, according to various embodiments.

Turning to FIG. 1, shown is an example system 101 including a multihead classifier/critic module 103, a generative/reinforcement learning (RL) module 105, a user access module 107, and a training module 109. As an example, the multihead classifier/critic module 103 can include a transformer encoder-based multihead classifier MLM. As another example, the multihead classifier/critic module 103 can include a convolutional neural network (CNN)-based multihead classifier MLM. As an additional example, the multihead classifier/critic module 103 can include a an autoencoder based MLM (e.g., where a classification label is extracted from the output of the encoder stage of the autoencoder). The module 103 can, as another example, alternatively include other MLM configurations (e.g., an ensemble of multiple single-head classifier MLMs).

The generative module 105/RL module can, as an example, include a transformer decoder-based generative MLM. As another example, the generative module 105/RL module can include a long term short memory (LSTM)-based generative MLM. As yet another example, the generative/RL module 105 can include a CNN-based generative MLM. An MLM of the generative/RL module 105 can be an RL-based MLM that takes various actions in pursuit of maximizing reward. As just an illustration, such an RL-based MLM can take the action of selecting news stories in view of a reward indicating whether given selected stories have caused viewing users to be happy.

The multihead classifier/critic module 103 can act in a critic role in training the generative/RL module 105. As an example, where the generative/RL module 105 includes a MLM that generates sentences, the multihead classifier/critic module 103 can act in a critic role by outputting labels that specify whether or not sentences generated by the generative/RL module 105 are coherent and convincing. As another example, where the generative/RL module 105 includes a MLM that selects news stories, the multihead classifier/critic module 103 can act in a critic role by outputting labels that specify whether or not users who have viewed the selected stories are happy.

The user access module 107 can allow access to output of the generative/RL module 105 (e.g., generated sentences generated images, or selected news stories). Further, the training module 109 can train one or more MLMs of the multihead classifier/critic module 103 to generate accurate output labels (e.g., labels indicating classifications) for given inputs, even where such inputs are OOD.

The training of the one or more MLMs of the multihead classifier/critic module 103 by the training module 109 can cause the MLMs to learn multiple functions/algorithms $A_0, \ldots, A_n$ that: a) correctly predict labels for labeled instances L of a set of training data; but b) are distinct on unlabeled instances U of the set of training data insofar as using different features to generate labels.

As additional examples, in the case of learned functions/algorithms $A_i$ and $A_j$ regarding reward functions, such distinctness on the unlabeled instances U can regard the function/algorithm $A_i$ and the function/algorithm $A_j$ being distinct on a given member of U: a) if $A_i$ and $A_j$ use different features to generate different reward values for that member of U; and/or b) if $A_i$ and $A_j$ use different features so as to have different optimal actions for that member of U. As still further examples, in the case of learned functions/algorithms $A_i$ and $A_j$ outputting recommender system lists, such distinctness on the unlabeled instances U can regard the function/algorithm $A_i$ and the function/algorithm $A_j$ being distinct on a given member of U: a) based on using different features so as to give different rankings for that member of U; and/or b) using different features so as to exhibit a different extent of absence of overlap in the rankings that they give for that member of U. In some embodiments, distinctness on the unlabeled instances U can regard a learned function/algorithm $A_i$ and a learned function/algorithm $A_j$ being distinct on a given member of U if the inner products and/or L1 norms of the probability distributions of the functions/algorithms for that member of U differ due to $A_i$ and $A_j$ using different features.

Relevantly, distinctness can regard a measure of distinctness between any two learned functions/algorithms $A_i$ and $A_j$ with respect to any single member of U. According to the functionality set forth herein, this framing of distinctness can be utilized to train MLMs in a more effective way via the beneficial approach of bootstrapping ambiguous data (e.g., one or more datapoints determined to be the most ambiguous). With this approach it is recognized that when $A_i$ and $A_j$ differ as to their predictions for a given member of U, such ambiguous datapoint can be expected to exhibit features that cause the disagreement. As such, the MLM training approaches discussed herein include amplifying (e.g., by stochastic gradient descent (SGD)) the difference on such an ambiguous datapoint, thereby causing $A_i$ and $A_j$ to use different features. Further still, according to various embodiments this amplification (e.g., by gradient descent) can be performed with respect to a subset of one or more U datapoints for which $A_i$ and $A_j$ disagree the most. As such, these embodiments beneficially allow merely a small number of ambiguous datapoints to be used. It is observed that according to the improved MLM training approaches discussed herein, there is not call to make assumptions regarding feature independence. Additionally, by way of the MLM training approaches discussed herein including having $A_i$ be correct on the labeled data L, training can yield a family of functions/algorithms that are the same on the labeled data L, but use different features on the unlabeled data U.

Thus, as just an illustration by way of MLM training approaches discussed herein, considering an example of a MLM that classifies pet images as being either cats or dogs, one function/algorithm can come to use features including spurious background-related features for distinguishing cat images from dog images, while another function/algorithm can come to use non-spurious/core animal-related features.

Figure 2:
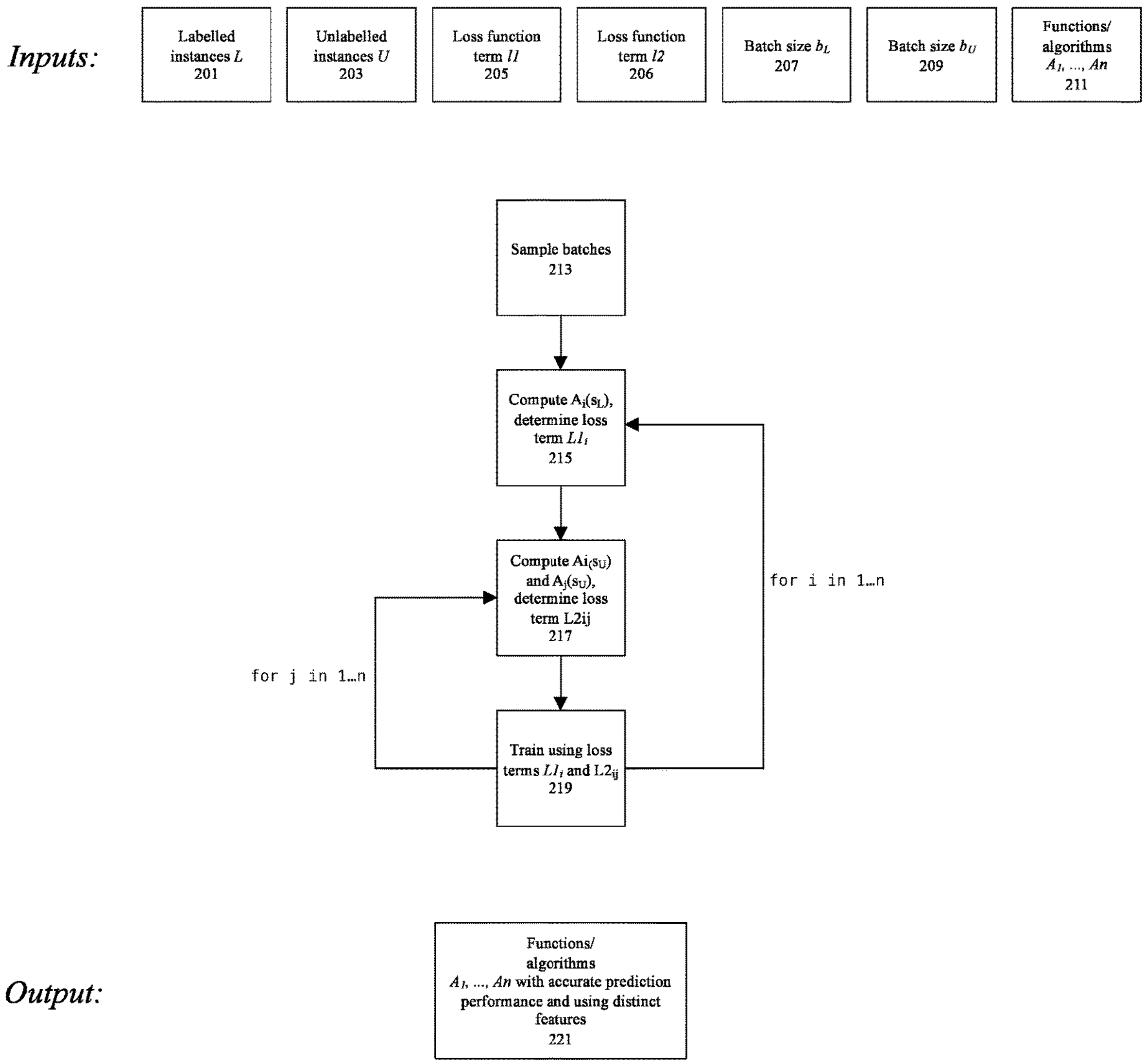
FIG. 2 shows an approach for MLM training, according to various embodiments.

Turning to FIG. 2, the above-referenced approaches for MLM training will now be discussed in greater detail. As just an example, the approaches discussed in connection with FIG. 2 can be used by the training module 109 to train a transformer encoder-based multihead classifier MLM of the classifier/critic module 103. In a first aspect, the functionality of FIG. 2 can take as input labeled instances L (201) of a set of training data. Here, L can include a set of desired labels as output set O. The functionality of FIG. 2 can further take as input unlabeled instances U (203) of the set of training data.

Further still, the functionality of FIG. 2 can take as input loss function term l1 (205) and loss function term l2 (206). Here, loss function term l1 can ensure correctness on the labeled data L, while loss function term l2 can ensure distinctness on individual members of unlabeled data U. In various embodiments, the l2 term can be driven higher when two values are closer to each other, and can be driven lower when the two values are further from each other. Also taken as input by the functionality of FIG. 2 can be batch size $b_L$ (207) specifying the number of data point considered with respect to L, and batch size $b_U$ (209) specifying the number of data point considered with respect to U.

Additionally taken as input by the functionality of FIG. 2 can be functions/algorithms $A_1, \ldots, A_n$ (211). This input can, for instance, take the form of reference to one or more MLMs that learn $A_1, \ldots, A_n$ (e.g., input in the form of reference to the transformer encoder-based multihead classifier MLM of the classifier/critic module 103). In various embodiments, the functionality of FIG. 2 can include initializing $A_1, \ldots, A_n$.

In operation, the functionality of FIG. 2 can, at 213, sample a batch $S_L$ of size $b_L$ from L. Further, at 213 the functionality of FIG. 2 can sample a batch $S_U$ of size $b_U$ from U. Considering the discussion laid out herein, it is noted that the use of capital letters can denote sets (and related concepts) while the use of lower case letters can denote elements (and related concepts).

Then, for 215-219, the functionality of FIG. 2 can use an iterator i, with i running from 1 to n. As just an illustration, a loop "for i in 1 . . . n" can be used. Using this iterator, the functionality of FIG. 2 can at 215 compute $A_i(s_L)$ for all $s_L$ in $S_L$. Also at 215, a total first loss term L1, can be determined by summing l1($A_i(s_L)$, $O(s_L)$) over $s_L$. In this way, 215 can for a multihead MLM use this first loss term to reward head i for the extent to which it properly predicts labels of the labeled training data instances.

For 217-219, the functionality of FIG. 2 can use an iterator j nested within the noted iterator i, with j running from 1 to n. As just an illustration, a loop "for j in 1 . . . n" can be nested within the noted loop "for i in 1 . . . n". In various embodiments, the nested j iterator can be configured so as to remove from consideration iterations for which i=j, and/or to eliminate duplicative operations. At 217, the functionality of FIG. 2 can compute $A_i(s_U)$ and $A_j(s_U)$ for all $s_U$ in $S_U$. In this way 217 as iterated via i and j can for a multihead MLM, with respect to each of the heads of that MLM, determine a predicted label with respect all elements of the unlabeled batch $S_U$. Further at 217 the functionality of FIG. 2 can, as just an example, select the data point $s_U$ with the minimal value of l2($A_i(s_U)$, $A_j(s_U)$) and utilize this minimal value for a second total loss term L2$_{ij}$. In this way, 217 as iterated via i and j can, for a multihead MLM, use this second loss term to reward each head i for the extent to which it disagrees with each of the other heads in terms of predicting labels for the noted data point $s_U$ having the minimal value of l2($A_i(s_U)$, $A_j(s_U)$). It is noted that computation of a value as discussed herein can include accessing a previously stored computation of that value. Then, at 219 the functionality of FIG. 2 can train (e.g., via SGD) using the loss terms L1$_i$ and L2$_{ij}$. Subsequently the functionality of FIG. 2 can repeat 213-219 multiple times so as to archive training for multiple batches (e.g., repeating 213-219 so as to draw all members of labeled data L and unlabeled data U).

In this way, the functionality of FIG. 2 can cause the functions/algorithms $A_1, \ldots, A_n$, to, on one hand, exhibit accurate prediction performance with respect to the labeled data L, and, on the other hand, to use distinct features when predicting, such distinct features being derived from the unlabeled data U. The functionality of FIG. 2 can, for instance, generate as output (221) reference to one or more MLMs that learn the functions/algorithms $A_1, \ldots, A_n$ (e.g., output in the form of reference to the transformer encoder-based multihead classifier MLM of the classifier/critic module 103).

Discussed above in connection with 217 has been selecting the data point $s_U$ with the minimal value of l2($A_i(s_U)$, $A_j(s_U)$). However, other possibilities exist. For example, top-k sampling can be used in selecting the data point whose l2($A_i(s_U)$, $A_j(s_U)$) value is utilized for the second total loss term L2$_{ij}$ (e.g., randomly selecting a data point from those k datapoints achieving the lowest l2($A_i(s_U)$, $A_j(s_U)$) values). As another example, such top-k sampling can utilize weightings. Further, in various embodiments, multiple data points $s_U$ exhibiting minimal l2($A_i(s_U)$, $A_j(s_U)$) values can be selected, with the second total loss term L2$_{ij}$ being the sum of l2($A_i(s_U)$, $A_j(s_U)$) over those multiple data points $s_U$.

It is observed that the various discussed approaches for $s_U$ data point selection in connection with determining the value for the second total loss term L2$_{ij}$ can, from one point of view, be seen as exhibiting the phenomenon of those data points with already low l2($A_i(s_U)$, Aj(sU)) values playing a major role in driving $A_i$ and $A_j$ (e.g., a given pair of heads of the multihead classifier MLM of the classifier/critic module 103) apart, and those exhibiting a high l2($A_i(s_U)$, $A_j(s_U)$) (and therefore having $A_i(s_U)$ and $A_j(s_U)$ close together) being essentially ignored.

Figure 3:
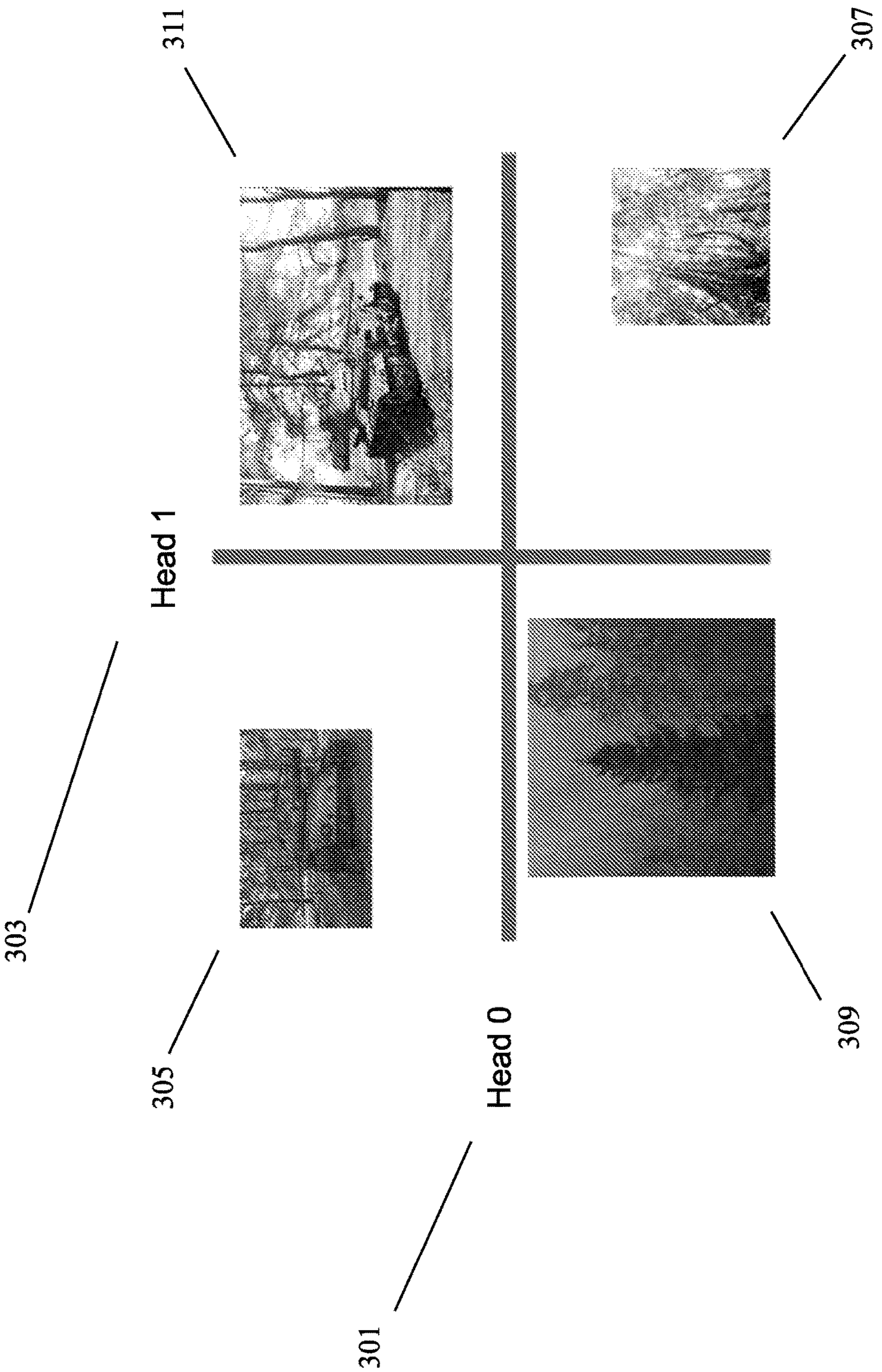
FIG. 3 shows a classifier applied to an MLM task of classifying military images, according to various embodiments.

Turning to FIG. 3, shown is an example circumstance of a two-head classifier applied to an MLM task of classifying military images as depicting either military tanks or forest. According to this example, an available conventional training set can suffer from all or many of the tank images being set against overcast weather, and from all or many of the forest images being set against sunny weather. Here, the conventional training set can exhibit underspecification with on one hand object-related (e.g., vehicle-related or vegetation-related) features, and on the other hand luminosity-related features, each according to conventional approaches seeming a valid set of features for distinguishing a tank image from a forest image.

With reference to the approaches for MLM training discussed, for instance, in connection with FIG. 2, a further training set can be generated, the further training set including labeled instances and unlabeled instances. In particular, the labeled instances can include dimly-lit tank images and brightly-lit forest images selected from the available conventional training set, with the labels correctly specifying whether corresponding images are tanks or forest. Further, the unlabeled instances can include tank and forest images at varying levels of luminosity (e.g., including brightly-lit tanks and dimly-lit forest, as well as dimly-lit tanks and brightly list forest images).

Via the training approaches discussed herein, the first term of the noted loss function can be used to reward each of head 301 and head 303 for the extent to which it properly predicts labels of the labeled training data instances (e.g., of labeled instances 305 and 307). Then, the second term of the loss function can be used to reward each of head 301 and head 303 for the extent to which it disagrees with the other head in terms of predicting labels for a selected subset of the unlabeled training data instances. With reference to that which is discussed above, this selected subset can include unlabeled training data instances for which there is maximal disagreement among heads 301 and 303 (e.g., the subset can include unlabeled instances 309 and 311).

Through application of the training approaches discussed herein, at least one of the heads 301 and 303 can properly use object-related features for distinguishing images, therefore allowing the multihead classifier MLM to correctly classify the military images. It is observed that the MLM training approaches discussed herein succeed with respect to this example MLM task despite the luminosity-related features being simpler than the object-related features.

Figure 4:
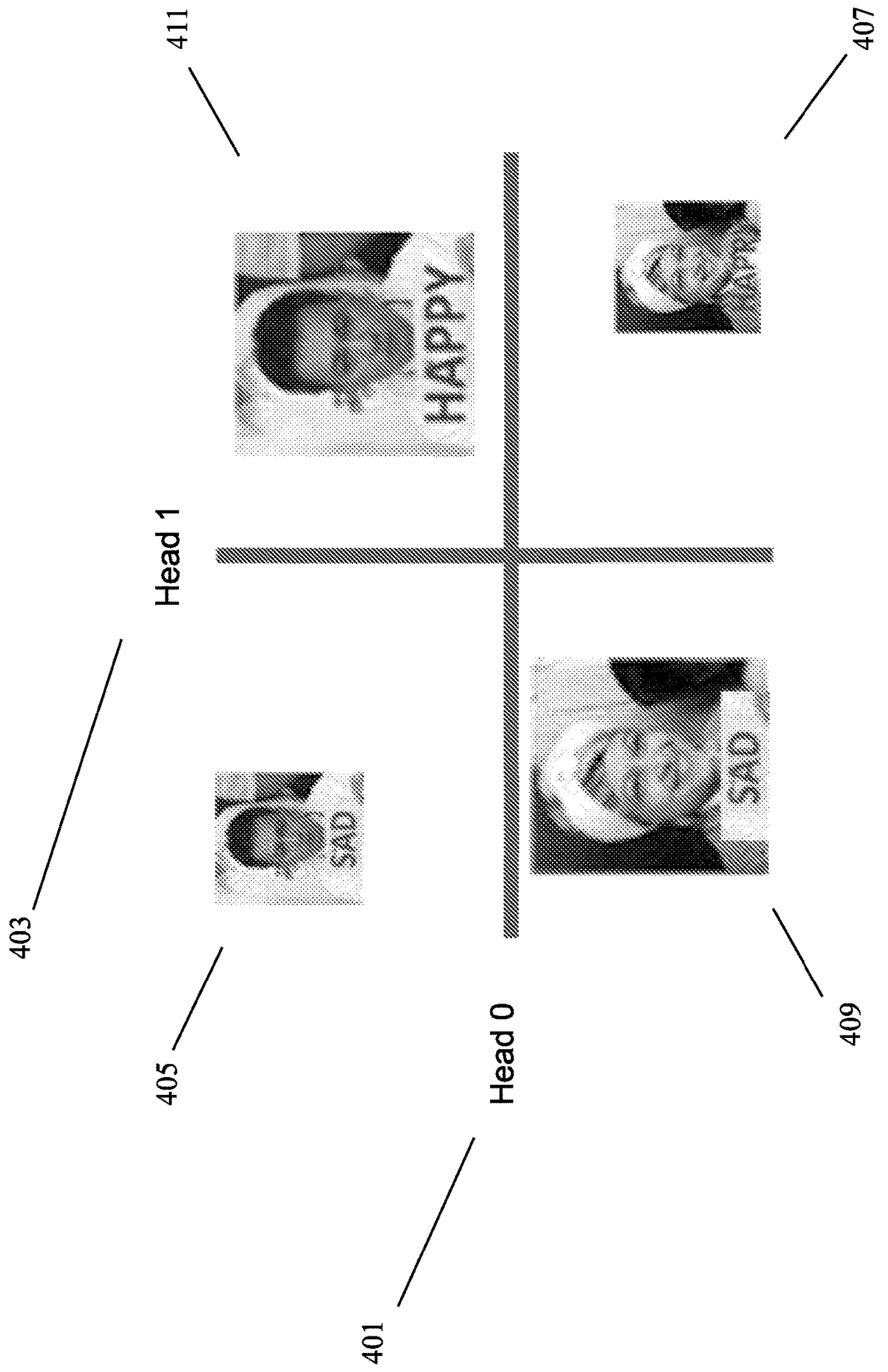
FIG. 4 shows a classifier applied to an MLM task of classifying face images, according to various embodiments.

Turning to FIG. 4, shown is an example circumstance of a two-head classifier applied to an MLM task of classifying face images as depicting either happiness or sadness. According to this example, an available conventional training set can suffer from all or many of the happy face images having the text "happy" superimposed thereon, and from all or many of the sad face images having the text "sad" superimposed thereon. Here, akin to the example of FIG. 3, the conventional training set can exhibit underspecification with on one hand facial expression-related features, and on the other hand text-related features, each according to conventional approaches seeming a valid set of features for distinguishing a happy face from a sad face.

A further training set can, as discussed herein, be generated, the further training set including labeled instances and unlabeled instances. The labeled instances can include happy faces bearing the text "happy" and sad faces bearing the text "sad" selected from the available conventional training set, with the labels correctly specifying whether corresponding images are happy or sad faces. On the other hand, the unlabeled instances can include sad faces bearing the text "happy" and happy faces bearing the text "sad" as well as happy faces bearing the text "happy" and sad faces bearing the text "sad."

Along the lines of the example of FIG. 3, the first term of the loss function can be used to reward each of head 401 and head 403 for the extent to which it properly predicts labels of the labeled training data instances (e.g., of labeled instances 405 and 407). Then, the second term of the loss function can be used to reward each of head 401 and head 403 for the extent to which it disagrees with the other head in terms of predicting labels for a selected subset of the unlabeled training data instances. As such, the selected subset can include unlabeled training data instances for which there is maximal disagreement among heads 401 and 403 (e.g., the subset can include unlabeled instances 409 and 411).

At least one of the heads 401 and 403 can, by virtue of the training approaches discussed herein, properly use facial expression-related features for distinguishing images, therefore allowing the multihead classifier MLM to correctly classify the face images, including images where superimposed text and facial expression do not match (e.g., sad faces having the text "happy"). Similar to the example of FIG. 3, the MLM training approaches discussed herein succeed despite the text-related features being simpler than the facial expression-related features.

As an example, the two-head classifier MLM of FIG. 4 can be an MLM of the multihead classifier/critic module 103. Further according to this example, the generative/RL module 105 can include a RL-based MLM that selects news stories that are intended to make viewing users happy. Further, the generative/RL module 105 can have access to a software module that can: a) present news stories selected by the generative/RL module 105 to users; b) capture (e.g., via a smartphone camera) facial expressions of users to whom the stories are presented; and c) superimpose "happy" or "sad" text on the captured facial expressions, with the choice of text to be superimposed being as specified by the generative/RL module 105.

During training, the MLM of the generative/RL module 105 can both take action to select a news story and take action to instruct the software module as to which of "happy" and "sad" to superimpose on the captured image of a user to whom that news story was presented. The generative/RL module 105 can then pass the captured image with superimposed text to the multihead classifier/critic module 103 in order to receive a reward corresponding to its having selected that news story.

Were the MLM of the multihead classifier/critic module 103 not a multihead classifier according to the approaches discussed herein but rather a conventional single-head classifier, and were it trained according to conventional approaches on an underspecified dataset where all or many of the images depicting happy facial expressions have the text "happy" superimposed thereon, and where all or many of the images depicting sad facial expressions can have the text "sad" superimposed hereon, undesirable operation could ensue. In particular, under these circumstances both facial expression-related features and text-related features could seem a valid set of features for distinguishing a happy face from a sad face. Moreover, as the text-related features are simpler than the facial expression-related features, it can be expected that the MLM of the multihead classifier/critic module 103 would come to use the text-related features, according to conventional approaches. As such, according to this conventional functionality the MLM of the multihead classifier/critic module 103 would misclassify when presented with OOD images, therefore generating a happy label when presented with a sad face having the text "happy," and generating a sad label when presented with a happy face having the text "sad."

Further according to this example, according to conventional approaches a wireheading situation could arise. In particular, during training it could become apparent to the MLM of the generative/RL module 105 that taking action to have the software module superimpose "happy" on a captured image was sufficient to receive a high reward for a selected news story. Moreover, as such superimposing action is simpler than taking action to select a news story that leads to actual user happiness, it can be expected that the RL-based MLM of the generative/RL module 105 will come to adopt that superimposing action.

In contrast, where the MLM of the multihead classifier/critic module 103 is a multihead classifier trained according to the approaches discussed herein, at least one of the heads thereof would properly use facial expression-related features for distinguishing images, therefore allowing the multihead classifier/critic module 103 to correctly classify captured images of users even when inappropriate text was superimposed thereon (e.g., the word "happy" superimposed on an image of a sad user). As such, according to the approaches discussed herein the RL-based MLM of the generative/RL module 105 would, during training, not receive a high reward for taking action to superimpose the word "happy" on the captured image of a sad user. As such, a wireheading situation would not arise according to the approaches discussed herein.

Figure 5:
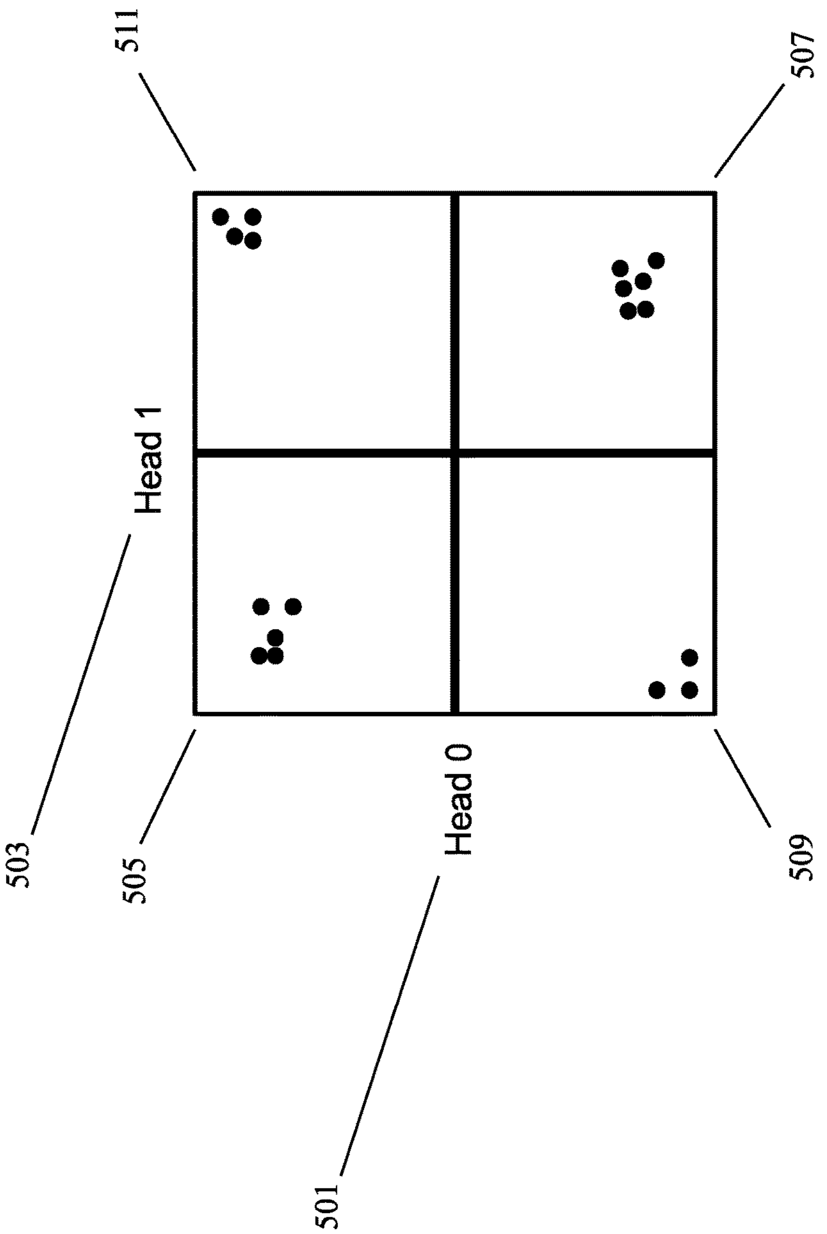
FIG. 5 shows a classifier applied to an MLM task of classifying sentences, according to various embodiments.

Now turning to FIG. 5, shown is an example circumstance of a two-head classifier applied to an MLM task of generating a classification output that specifies whether or not an inputted sentence is coherent and convincing. As just an example, this MLM task can utilize a transformer encoder-based two-head classifier, such as a BERT classifier.

According to the example of FIG. 5, an available conventional training set can suffer from all or many of the sentences labeled so as to indicate presence of coherence/convincingness not including two or more words repeated three or more times, and from all or many of the sentences labeled so as to indicate lack of coherence/convincingness including two or more words repeated three or more times. Here, akin to the example of FIGS. 3 and 4, the conventional training set can exhibit underspecification with on one hand features relating to the noted word repetition, and on the other hand features more broadly and accurately capturing the concept of sentence coherence/convincingness each according to conventional approaches seeming a valid set of features for distinguishing a sentence that exhibits coherence/convincingness from one that does not. Here, the features more broadly and accurately capturing the concept of sentence coherence/convincingness can be considered non-spurious/core features, while the features relating to word repetition can be considered spurious features. In this regard it is observed, for instance, that a sentence can exhibit the noted word repetition yet nevertheless be convincing and coherent, while a sentence can fail to exhibit such word repetition yet still be neither convincing nor coherent.

Using the approaches discussed herein a further training set can be generated, the further training set including labeled instances and unlabeled instances. The labeled instances can include coherent/convincing sentences that do not exhibit the noted word repetition, with the corresponding labels indicating this coherency/convincingness. The labeled instances can also include incoherent/non-convincing sentences that exhibit the noted word repetition, with the labels indicating this lack of coherency/convincingness. Further, the unlabeled instances can include sentences that exhibit the noted word repetition yet nevertheless are convincing and coherent, and sentences that fail to exhibit the noted word repetition yet still are neither convincing nor coherent. Further still, the unlabeled instances can include coherent/convincing sentences that do not exhibit the noted word repetition and incoherent/non-convincing sentences that exhibit the noted word repetition.

Along the lines of the examples of FIGS. 3 and 4, the first term of the loss function can be used to reward each of head 501 and head 503 for the extent to which it properly predicts labels of the labeled training data instances (e.g., of labeled instances 505 and 507). Then, the second term of the loss function can be used to reward each of head 501 and head 503 for the extent to which it disagrees with the other head in terms of predicting labels for a selected subset of the unlabeled training data instances. As such, the selected subset can include unlabeled training data instances for which there is maximal disagreement among heads 501 and 503 (e.g., the subset can include unlabeled instances 509 and 511).

At least one of the heads 501 and 503 can, by virtue of the training approaches discussed herein, properly use features broadly and accurately capturing the concept of sentence coherence/convincingness for distinguishing sentences, therefore allowing the multihead classifier MLM to correctly classify the sentences, including: a) sentences that exhibit word repetition yet nevertheless are convincing and coherent; and b) sentences that fail to exhibit word repetition yet still are neither convincing nor coherent Similar to the example of FIGS. 3 and 4, the MLM training approaches discussed herein succeed despite the features relating to word repetition being simpler than the features broadly and accurately capturing the concept of sentence coherence/convincingness.

As an example, the two-head classifier MLM of FIG. 5 can be an MLM of the multihead classifier/critic module 103. Further according to this example, the generative/RL module 105 can include a RL-based MLM that generates sentences (e.g., a transformer decoder-based generative MLM). During training, the MLM of the generative/RL module 105 can take action to generate a sentence. The generative/RL module 105 can then pass the generated sentence to the multihead classifier/critic module 103 in order to receive a reward corresponding to its having generated that sentence.

Were the MLM of the multihead classifier/critic module 103 not a multihead classifier according to the approaches discussed herein but rather a conventional single-head classifier, and were it trained according to conventional approaches on an underspecified dataset where all or many of the coherent and convincing sentences do not exhibit word repetition, and where all or many of the sentences that are neither convincing nor coherent do exhibit word repetition, undesirable operation could ensue. In particular, under these circumstances both features relating to word repetition and features more broadly and accurately capturing the concept of sentence coherence/convincingness could seem a valid set of features for distinguishing a sentence that exhibited coherence/convincingness from one which did not. Moreover, as the features relating to word repetition are simpler than the features broadly and accurately capturing the concept of sentence coherence/convincingness, it can be expected that the MLM of the multihead classifier/critic module 103 would come to use the word repetition features, according to conventional approaches. As such, according to this conventional functionality the MLM of the multihead classifier/critic module 103 would misclassify when presented with OOD images, therefore generating a label indicating coherence/convincingness when presented with an incoherent/non-convincing sentence not exhibiting word repetition, and generating a label indicating lack of coherence/convincingness when presented with a coherent/convincing sentence exhibiting word repetition.

Further according to this example, according to conventional approaches a wireheading situation could arise. In particular, during training it could become apparent to the MLM of the generative/RL module 105 that taking action to generate sentences that do not exhibit word repetition was sufficient to receive high rewards for sentence generation. Moreover, as such a course of action is simpler than taking action to generate sentences that are actually convincing and coherent (e.g., sentences exhibiting the noted features broadly and accurately capturing the concept of sentence coherence/convincingness), it can be expected that the RL-based MLM of the generative/RL module 105 would adopt this simpler course of action.

In contrast, where the MLM of the multihead classifier/critic module 103 is a multihead classifier trained according to the approaches discussed herein, at least one of the heads thereof would properly use features broadly and accurately capturing the concept of sentence coherence/convincingness for distinguishing sentences, therefore allowing the multihead classifier/critic module 103 to correctly classify even OOD sentences. As such, according to the approaches discussed herein the RL-based MLM of the generative/RL module 105 would, during training, not receive a high reward for taking action to merely generate sentences that do not exhibit word repetition (as opposed to sentences that are actually convincing and coherent). As such, a wireheading situation would not arise according to the approaches discussed herein.

Figure 6:
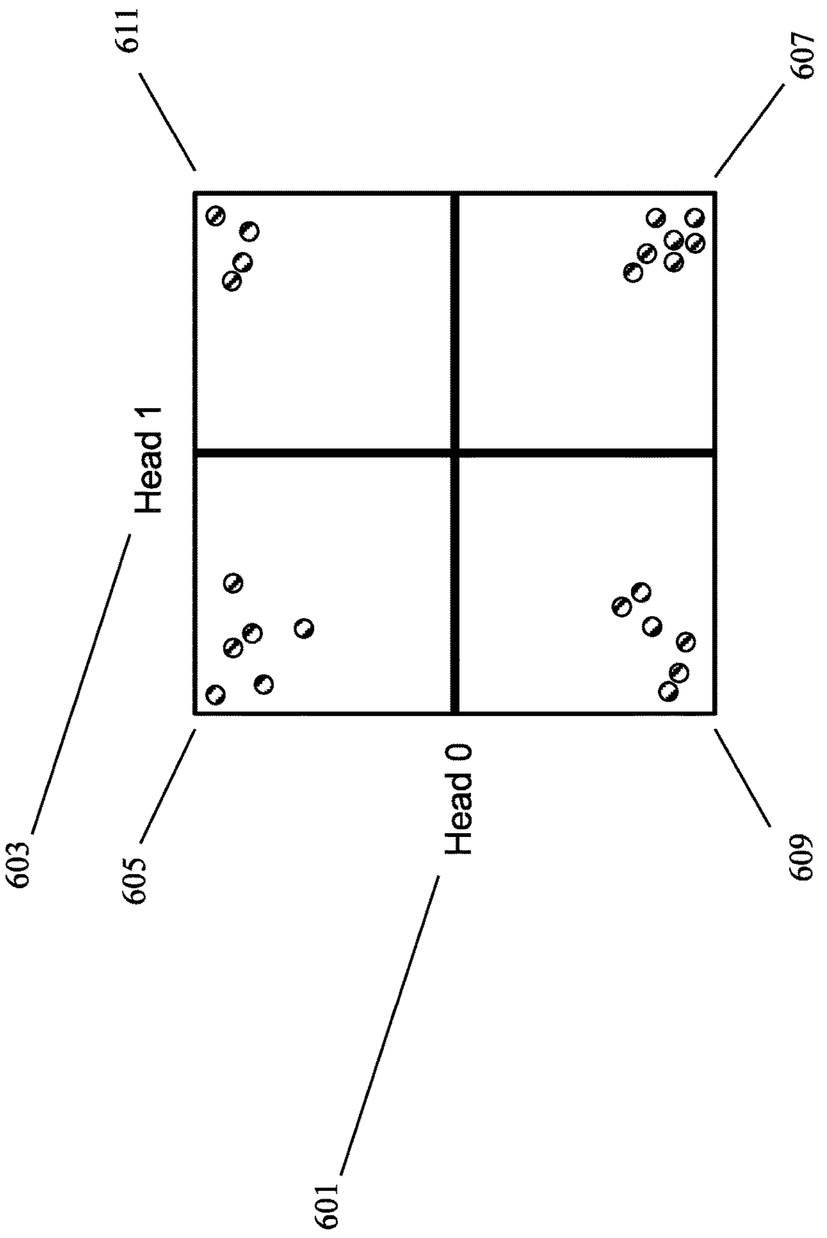
FIG. 6 shows a classifier applied to a further MLM task of classifying sentences, according to various embodiments.

Now turning to FIG. 6, shown is an example circumstance of a two-head classifier applied to an MLM task of classifying inputted sentences as conveying hate speech or as conveying non-hate speech. As just an example, the MLM task can utilize a transformer encoder-based two-head classifier, such as a BERT classifier. According to this example, an available conventional training set can suffer from all or many of the sentences labeled so as to indicate hate speech including both language referring to religion and language expressing hatred (e.g., language expressing ethnic-oriented hatred), and from all or many of the sentences labeled so as to indicate non-hate speech including neither language referring to religion nor language expressing hatred. As such the conventional training set can exhibit underspecification with on one hand features concerning religion-referencing language, and on the other hand features concerning hatred-expressing language each according to conventional approaches seeming a valid set of features for distinguishing a hate speech sentence from a non-hate speech sentence. Here, the features concerning hatred-expressing language can be considered non-spurious/core features, while the features concerning religion-referencing language can be considered spurious features. Further, to the extent that the features concerning religion-referencing language are simpler than the features concerning hatred-expressing language, it can be expected that the two-head classifier would come to use the features concerning religion-referencing language, were conventional approaches utilized.

Utilizing the approaches discussed herein a further training set can be generated, the further training set including labeled instances and unlabeled instances. The labeled instances can include hate speech sentences that include both religion-referencing language and hatred-expressing language, with the corresponding labels indicating these sentences to be hate speech sentences. The labeled instances can also include non-hate speech sentences that include neither religion-referencing language nor hatred-expressing language, with the corresponding labels indicating these sentences to be non-hate speech sentences. Further, the unlabeled instances can include sentences that include the noted religion-referencing language yet nevertheless are non-hate speech sentences, and sentences that fail to exhibit the noted religion-referencing language yet still are hate speech sentences. Further still, the unlabeled instances can include sentences that include the noted religion-referencing language and are hate speech sentences, and sentences that do not include the noted religion-referencing language and are non-hate speech sentences.

Along the lines of the examples of FIGS. 3, 4, and 5, the first term of the loss function can be used to reward each of head 601 and head 603 for the extent to which it properly predicts labels of the labeled training data instances (e.g., labeled instances 605 and 607). Further, the second term of the loss function can be used to reward each of head 601 and head 603 for the extent to which it disagrees with the other head in terms of predicting labels for a selected subset of the unlabeled training data instances. The selected subset can include unlabeled training data instances for which there is maximal disagreement among heads 601 and 603 (e.g., the subset can include unlabeled instances 609 and 611).

By virtue of the training approaches discussed herein, at least one of the heads 601 and 603 can come to properly use features concerning hatred-expressing language for distinguishing sentences. As such, the multihead classifier MLM can come to correctly classify sentences, including: a) sentences that include religion-referencing language yet nevertheless are non-hate speech sentences; and b) sentences that fail to include religion-referencing language yet still are hate speech sentences. The MLM training approaches discussed herein can succeed even where the features concerning religion-referencing language are simpler than the features concerning hatred-expressing language.

Discussed herein have been training approaches that utilize both labeled instances and unlabeled instances of a set of training data. However, other possibilities exist. For example, the training approaches discussed herein can be implemented in a modified manner that utilizes only labeled instances, without there being call to also use unlabeled instances.

As an example of such a modified approach, multiple labeled instances (e.g., a batch of labeled instances) can be provided as input to a multihead classifier MLM that has n heads. When a given instance (e.g., an image or a sentence) i of the multiple instances is passed through the classifier, each of the n heads can map the instance i to a classification. In this way, the MLM can generate n classifications for the instance i. The training of the multihead classifier MLM can include consideration of: a) the accuracy of the n classifications; and b) the ambiguity of the n classifications.

In particular, for a given instance i the accuracy can correspond to the average distance of those n classifications from a label for that instance i according to the training set. The ambiguity for a given instance i can correspond to how much the n classifications differ for that instance i. In this way, the noted operations of passage to the MLM, consideration of accuracy, and consideration of ambiguity can be performed for each of the multiple instances i.

The training of the multihead classifier MLM can further include selecting: a) the C instances i that yielded the highest accuracy results; and b) the B instances i that yielded the highest ambiguity results. The quantities for C and B can be tunable hyperparameters. Further still, the training of the multihead classifier MLM can include: a) utilizing SGD to encourage the n heads to more accurately generate labels for the selected accurate C instances; and b) utilizing SGD to encourage the n heads to more distinctly generate labels for the selected ambiguous instances B.

As such, according to the foregoing the training approaches discussed herein can be modified so as to be able to use only labeled instances, without call to also use unlabeled instances.

As referenced above, approaches discussed herein can be applied in RL contexts. According to various embodiments, implementation thereof can include utilizing loss functions that cause RL reward functions to be distinct with respect to unlabeled data. As just some examples, such loss functions can incorporate criteria such as: a) requiring that reward functions have different optimal actions; b) requiring that reward functions have different value functions; and c)

requiring that reward functions be as numerically distinct from one another as possible.

Further still, in various embodiments functionality discussed herein can be implemented in a fashion that utilizes reinforcement learning from human feedback (RLHF). According to these embodiments, labeled data as discussed herein can be provided using annotated human-sourced data. Further according to these embodiments, unlabeled data as discussed herein can be provided via new data. As just some examples, this new data can be generated by humans, be generated by MLMs, or be generated using both humans and MLMs. Where there is implementation of the just-discussed approaches of utilizing loss functions that cause RL reward functions to be distinct with respect to unlabeled data, the RL reward functions can be distinct on this new unlabeled data.

It is noted that the approaches discussed herein have wide applicability, and are not limited to the various examples discussed herein. As just some examples, the approaches discussed herein can be utilized in connection with applications including (but not limited to) chatbots, content moderation, prompt-specification, and action-driven AI.

Hardware and Software

According to various embodiments, various functionality discussed herein can be performed by and/or with the help of one or more computers. Such a computer can be and/or incorporate, as just some examples, a personal computer, a server, a smartphone, a system-on-a-chip, and/or a microcontroller. Such a computer can, in various embodiments, run Linux, MacOS, Windows, or another operating system.

Figure 7:
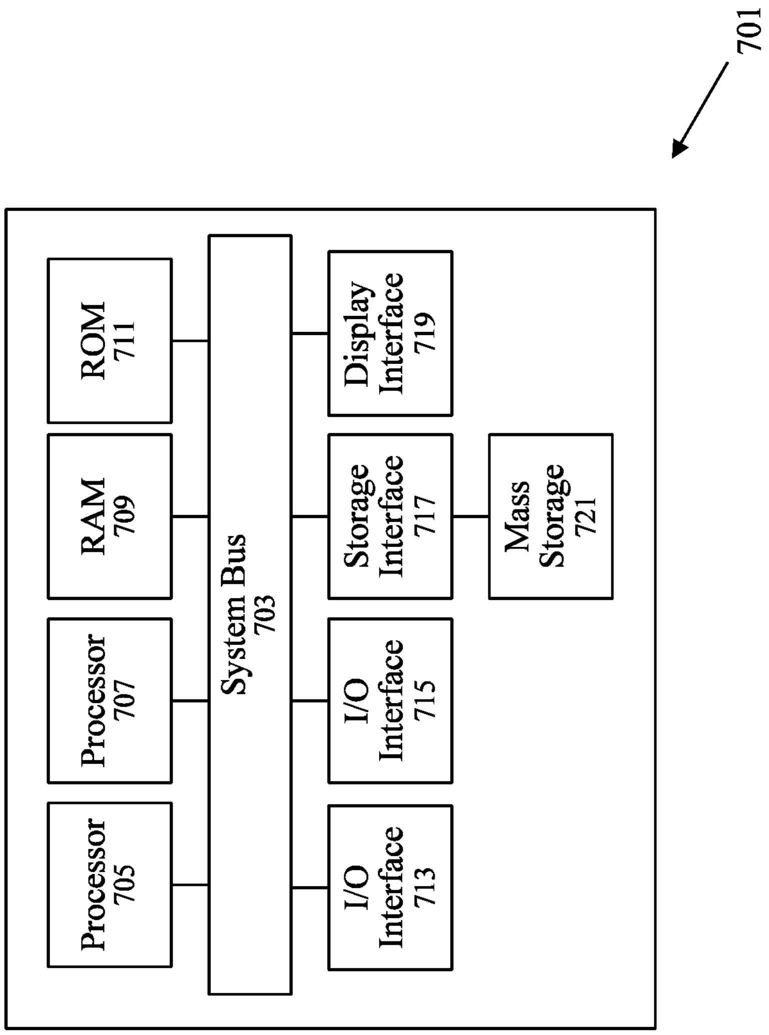
FIG. 7 shows an example computer, according to various embodiments.

Such a computer can also be and/or incorporate one or more processors operatively connected to one or more memory or storage units, wherein the memory or storage may contain data, algorithms, and/or program code, and the processor or processors may execute the program code and/or manipulate the program code, data, and/or algorithms. Shown in FIG. 7 is an example computer employable in various embodiments of the present invention. Exemplary computer 701 includes system bus 703 which operatively connects two processors 705 and 707, random access memory (RAM) 709, read-only memory (ROM) 711, input output (I/O) interfaces 713 and 715, storage interface 717, and display interface 719. Storage interface 717 in turn connects to mass storage 721. Each of I/O interfaces 713 and 715 can, as just some examples, be a Universal Serial Bus (USB), a Thunderbolt, an Ethernet, a Bluetooth, a Long Term Evolution (LTE), a 5G, an IEEE 488, and/or other interface. Mass storage 721 can be a flash drive, a hard drive, an optical drive, or a memory chip, as just some possibilities. Processors 705 and 707 can each be, as just some examples, a commonly known processor such as an ARM-based or x86-based processor. Computer 701 can, in various embodiments, include or be connected to a touch screen, a mouse, and/or a keyboard. Computer 701 can additionally include or be attached to card readers, DVD drives, floppy disk drives, hard drives, memory cards, ROM, and/or the like whereby media containing program code (e.g., for performing various operations and/or the like described herein) may be inserted for the purpose of loading the code onto the computer.

In accordance with various embodiments of the present invention, a computer may run one or more software modules designed to perform one or more of the above-described operations. Such modules can, for example, be programmed using Python, Java, JavaScript, Swift, C, C++, C#, and/or another language. Corresponding program code can be placed on media such as, for example, DVD, CD-ROM, memory card, and/or floppy disk. It is noted that any indicated division of operations among particular software modules is for purposes of illustration, and that alternate divisions of operation may be employed. Accordingly, any operations indicated as being performed by one software module can instead be performed by a plurality of software modules. Similarly, any operations indicated as being performed by a plurality of modules can instead be performed by a single module. It is noted that operations indicated as being performed by a particular computer can instead be performed by a plurality of computers. It is further noted that, in various embodiments, peer-to-peer and/or grid computing techniques may be employed. It is additionally noted that, in various embodiments, remote communication among software modules may occur. Such remote communication can, for example, involve JavaScript Object Notation-Remote Procedure Call (JSON-RPC), Simple Object Access Protocol (SOAP), Java Messaging Service (JMS), Remote Method Invocation (RMI), Remote Procedure Call (RPC), sockets, and/or pipes.

Moreover, in various embodiments the functionality discussed herein can be implemented using special-purpose circuitry, such as via one or more integrated circuits, Application Specific Integrated Circuits (ASICs), or Field Programmable Gate Arrays (FPGAs). A Hardware Description Language (HDL) can, in various embodiments, be employed in instantiating the functionality discussed herein. Such an HDL can, as just some examples, be Verilog or Very High Speed Integrated Circuit Hardware Description Language (VHDL). More generally, various embodiments can be implemented using hardwired circuitry without or without software instructions. As such, the functionality discussed herein is limited neither to any specific combination of hardware circuitry and software, nor to any particular source for the instructions executed by the data processing system.

The invention claimed is:

1. A computer-implemented method, comprising:

providing, by a computing system, to a machine learning model, one or more labelled training data instances; receiving, by the computing system, from the machine learning model, generated output, wherein the generated output comprises predicted labels for the labelled training data instances; determining, by the computing system, a first loss function term, wherein the first loss function term rewards each of multiple elements of the machine learning model for the extent to which it properly predicts labels of the labelled training data instances; providing, by the computing system, to the machine learning model, one or more unlabelled training data instances; receiving, by the computing system, from the machine learning model, generated output, wherein the generated output comprises predicted labels for the unlabelled training data instances;

and determining, by the computing system, a second loss function term, wherein the second loss function term rewards each of the multiple elements of the machine learning model for the extent to which it disagrees with each of other elements of the machine learning model in predicting labels for a subset of the unlabelled training data instances;

wherein the multiple elements of the machine learning model are multiple output heads, wherein said multiple output heads are classifier heads, each of which produces its own label prediction for the same input of the machine learning model.

2. The computer-implemented method of claim 1, further comprising: training, by the computing system, the machine learning model using the first loss function term and the second loss function term, wherein the second loss function term is a cross-head comparison on the same data training instance, which includes joint training of all heads under the divergent reward.

3. The computer-implemented method of claim 1, further comprising: selecting, by the computing system, the subset as a quantity of the unlabelled training data instances for which there is maximal disagreement among elements of the machine learning model.

4. The computer-implemented method of claim 1, wherein said predicted labels comprise class labels, reward labels, or recommendation labels and wherein each of said multiple output heads is associated with a reward function.

5. The computer-implemented method of claim 4, wherein the multiple output heads of the machine learning model are trained to predict proper labels for the labelled training data instances and to be distinct on the unlabelled training data instances, and further, wherein said multiple output heads are operating in parallel, such that that no head is downstream from the output of another head, regardless of whether or not the heads are themselves downstream from the same core model, each providing a separate prediction on the same one or more unlabelled training data instances, such that said separate predictions can be compared and rewarded for divergence.

6. The computer-implemented method of claim 1, wherein the machine learning model is one of a transformer encoder-based classifier, convolutional neural network-based classifier, or an autoencoder-based machine learning model.

7. The computer-implemented method of claim 1, wherein the machine learning model is a critic machine learning model, and wherein the critic machine learning model generates reward output for a second machine learning model.

8. The computer-implemented method of claim 7, wherein the second machine learning model is one of a transformer decoder-based generative machine learning model, long term short memory-based generative machine learning model, or a convolutional neural network-based generative machine learning model.

9. The computer-implemented method of claim 1, wherein said training data instances comprise one or more of sentences, images, or images superimposed with text.

10. A system, comprising: at least one processor; and a memory storing instructions that, when executed by the at least one processor, cause the system to perform: providing, to a machine learning model, one or more labelled training data instances; receiving, from the machine learning model, generated output, wherein the generated output comprises predicted labels for the labelled training data instances;

determining a first loss function term, wherein the first loss function term rewards each of multiple elements of the machine learning model for the extent to which it properly predicts labels of the labelled training data instances; providing, to the machine learning model, one or more unlabelled training data instances; receiving, from the machine learning model, generated output, wherein the generated output comprises predicted labels for the unlabelled training data instances; and determining a second loss function term, wherein the second loss function term rewards each of the multiple elements of the machine learning model for the extent to which it disagrees with each of other elements of the machine learning model in predicting labels for a subset of the unlabelled training data instances;

and further; wherein the multiple elements of the machine learning model are multiple output heads, wherein said multiple output heads are classifier heads, each of which produces its own label prediction for the same input of the machine learning model;

and further, wherein said predicted labels comprise class labels, reward labels, or recommendation labels and wherein each of said multiple output heads is associated with a reward function;

and further, wherein said multiple output heads are operating in parallel, such that that no head is downstream from the output of another head, regardless of whether or not the heads are themselves downstream from the same core model, each providing a separate prediction on the same one or more unlabelled training data instances, such that said separate predictions can be compared and rewarded for divergence;

and wherein the instructions, when executed by the at least one processor, further cause the system to perform: training the machine learning model using the first loss function term and the second loss function term . . . and/or . . . selecting the subset as a quantity of the unlabelled training data instances for which there is maximal disagreement among elements of the machine learning model;

and wherein the machine learning model is selected from the group consisting of (i) a transformer encoder-based classifier, (ii) a convolutional neural network-based classifier, (iii) an autoencoder-based machine learning model and (iv) a critic machine learning model, and wherein the critic machine learning model generates reward output for a second machine learning model.

* * * * *